March 4, 1952 K. J. KNUDSEN 2,588,014
RESISTANCE THERMOMETER BULB
Filed April 27, 1949
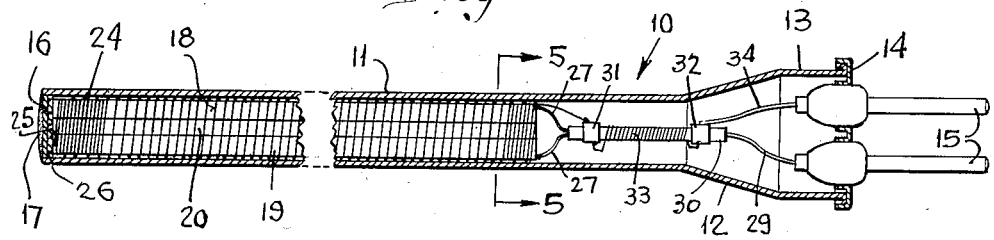
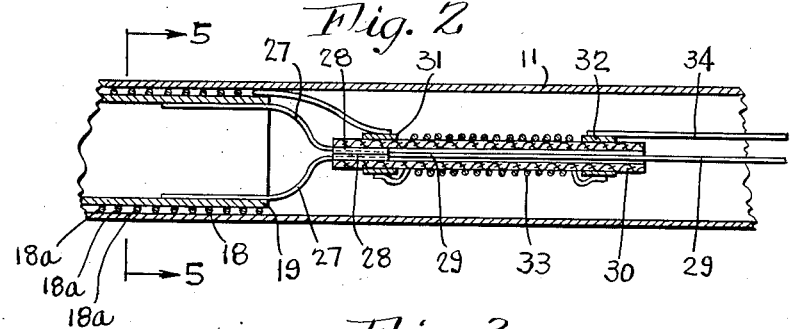
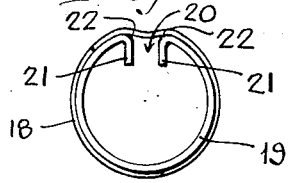
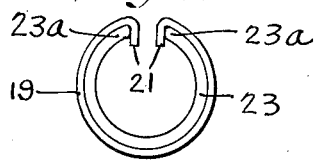
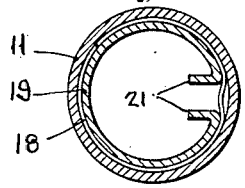
Inventor
Knud J. Knudsen
By
Johnson and Kline
Attorneys Patented Mar. 4, 1952

2,588,014

UNITED STATES PATENT OFFICE 2,588,014

RESISTANCE THERMOMETER BULB

Knud J. Knudsen, Naugatuck, Conn., assignor to The Lewis Engineering Company, Naugatuck, Conn., a corporation of Connecticut Application April 27, 1949, Serial No. 90,009

11 Claims. (Cl. 201—63)

This invention relates to resistance thermometer bulbs.

An object of the invention is to provide an improved resistance thermometer bulb which is extremely sensitive and rapid in its response to temperature changes.

Another object of the invention is to provide an improved resistance bulb of this type, which is very accurate and reliable in operation over an extended period of use.

Yet another object of the invention is to provide an improved resistance bulb characterized as above, which has relatively few parts and is of simple and economical construction.

A still further object of the invention is to provide a resistance thermometer bulb in accordance with the foregoing, which is sturdy in construction and resistant to shock and vibration.

In accomplishing the above objects I provide, in accordance with the invention, a tubular metal casing adapted to be inserted into a well in a heated instrumentality such as an engine block or the like. Within the casing there is provided a coil of heat-responsive wire, all convolutions of which are closely adjacent the inner casing walls. I make the distance between said said convolutions and the inside of the casing extremely small and of a minute order, thereby to promote an extremely efficient and effective transfer of heat from the casing to the coil.

I further provide means, one form of which comprises a one-piece tubular coil form of very thin metal and small mass, as disclosed in the embodiment of the invention illustrated herein, for securely supporting the coil in the casing in said closely spaced relationship to the walls, and at the same time aiding rather than hindering the conformance of the coil temperature with that of the casing.

To electrically insulate the coil from the casing a tough, heat resistant insulating means is provided, which may be an extremely thin film of silicone coated on the wire. I have found that such silicone coating provides an advantageous and adequate electric insulation between the spaced coil convolutions and the casing, which will readily withstand the relatively high temperatures to which resistance bulbs are subjected, and which is stable, tough and resistant to abrasion. By locating the coil convolution in such close proximity to the inside walls of the casing an extremely sensitive, rapid response device results, which quickly changes resistance with changes in temperature of the heated instrumentality in which the casing is mounted.

In conjunction with this sensitive response assembly, connector junctions are provided having opposed E. M. F.'s, said junctions being located closely adjacent each other whereby they are subjected to equal heat, and therefore generate equal voltages which cancel each other out. This organization results in an accurate and reliably performing resistance bulb.

The mounting for the heat-responsive coil, which comprises a single tubular member, carries extension strips which support the junctions or terminals for the coil whereby very few parts are required. The structure is therefore simple and economical to fabricate and produce.

Other features and advantages will hereinafter appear.

In the accompanying drawing:

Figure 1 is an axial sectional view of the improved resistance thermometer bulb of this invention.

Fig. 2 is an enlarged detail in section, showing the mounting for the connections or junctures of the coils.

Fig. 3 is an end elevational view of the heat-responsive coil and coil form assembly.

Fig. 4 is an end view of the coil form carried by an arbor and reduced slightly in diameter prior to the winding of the heat-responsive coil, and Fig. 5 is a transverse sectional view taken on line 5—5 of Figs. 1 and 2.

As shown, the present improved resistance bulb comprises an elongate tubular metal casing 10 having a straight or cylindrical portion 11, a conical or flared portion 12 and a mouth portion 13, the latter carrying a sealing cap 14 insulatingly mounting connecting pins 15.

The casing 10 is adapted to be carried by a suitable fitting and mounted to extend into a well of a heated instrumentality such as an engine block or the like, as is well understood in the art.

The small end of the casing 10 is provided with a disk-like closure member 16 which is secured in place in any suitable manner, as by silver solder 17.

The casing 10, cap 14 and closure disk 16 may be advantageously made of stainless steel.

In accordance with the invention, a heat-responsive coil 18 is provided within the casing 10 to lie closely adjacent the inner casing walls, the distance between the coil convolutions and the inside of the casing portion 11 being extremely small or of a minute order so as to promote an extremely effective and efficient transfer of heat from the casing to the coil. Preferably the coil 18 is of nickel wire, although other suitable metal may be used.

The coil 18 is, in the specific embodiment of the invention illustrated herein, a single layer coil having convolutions 18a uniformly spaced apart a slight amount, as for example a thirty-second of an inch.

For the purpose of securely supporting the coil 18 in its position closely adjacent the inside walls of the casing portion 11, and to enhance the response of the coil to changes in the temperature of the casing, I provide by the present invention a novel tubular coil form 19 of very thin metal and small mass, the form being longitudinally split to provide a longitudinal slot 20 and the adjacent edges of the coil form on opposite sides of the slot being turned in to provide flanges 21 (Fig. 3) and rounded portions or surfaces 22.

The heat-responsive wire of the coil 18 is insulated with a silicone coating, preferably prior to the wire being wound on the coil form 19. In order to maintain the convolutions of the coil 18 taut, prior to winding the coil, I mount the coil form 19 on a tubular mandrel or arbor 23 which is also longitudinally split whereby the longitudinal edges 23a of the mandrel engage the inturned flanges 21 of the coil form and pull the latter in to a slightly smaller diameter. The coil form 19 is preferably made of the same metal (nickel) as the coil 18, and is resilient and extremely thin, on the order of .002 inch thick, whereby it has a very small mass. In consequence of this, the tendency of the coil form 19 is to aid the conformance of the coil temperature with that of the casing. This is because by virtue of its small mass and large area exposed to the inside walls of the casing, the temperature of the coil form itself will very closely follow the temperature of the casing. Heat radiated from the casing interior will be effectively intercepted by the coil form, as can be readily understood, and this heat will be quickly transferred to the convolutions 18a of the coil 18.

When the coil form 19 is mounted on the arbor 23, the latter may be placed in a lathe or coil winding machine and the coil 18 wound on the form. To protect the winding 18, the end portions thereof may have threads 24 of glass fibers interposed between the coil convolutions, and the entire coil and coil form may be bonded together by the application of a suitable silicone adhesive during the winding operation. One end 25 of the coil 18 may be brazed, welded, or otherwise suitably secured to the coil form 19 as shown in Fig. 1, whereby the form functions as a ground return for the coil.

As shown in Figs. 3 and 5, the portions of the coil convolutions which bridge the slot 20 are bent inward, into the slot a slight distance, after the winding of the coil has been completed and while it is still on the mandrel. By doing this, variation in the coil diameter is made possible, for a purpose which is explained below.

I have found that a coil and coil form assembly as constructed above provides a highly advantageous heat-responsive unit in conjunction with the casing 10. When the coil and coil form are removed from the mandrel 23, the form 19 tends to expand diametrically and to maintain the convolutions of the coil 18 taut. The assemblage is closely controlled as to its effective outside diameter by the mandrel 23, and after removal from the mandrel it may be readily slipped into the cylindrical portion 11 of the casing, the dimensions of which are such that a close fit is provided. The convolutions of the coil 18 are preferably at all points practically in contact with the inner surface of said casing portion.

If tightness is encountered during the insertion of the coil 18 and coil form 19 into the casing 10, the coil and form may yield and become smaller in diameter, enabling the inserting operation to readily proceed. This yield is made possible by the bent portions of the coil convolutions, which span the slot 20 and extend slightly into the same. I have found that the coil and casing may be so dimensioned that the casing slightly compresses the coil and coil form, causing a continual slight pressure to exist whereby the heat exchange is facilitated further.

The double silicone coating on the wire coil (one prior to winding and one subsequent to winding of the coil) effectively insulates the coil convolutions from the casing 10, while at the same time enabling efficient transfer of heat to take place from the casing to the coil. Preferably, as shown in Fig. 1, an insulating disk 26 of woven glass fibers, impregnated with silicone, is disposed adjacent the end closure 16 of the casing to prevent contact between the closure and the coil form 19 which constitutes part of the electrical circuit of the bulb.

For the purpose of carrying calibrating means for the coil 18 and providing for electrical connections thereto, terminal members 27 in the form of nickel strips having reverse bends in them are welded to the inside of the coil form prior to the winding of the coil. The strips have juxtaposed semicylindrical cooperable portions 18 adapted to receive a lead wire 29 whereby electrical connection may be effected to the coil form 19. Preferably the wire 29 and strip portions 28 are all welded or bonded together in a single operation. It will be noted that the strips 27, especially the portions 28 thereof, constitute in effect a stud which extends axially from the end of the coil form 19.

In order to insulatedly carry a calibrating coil for the heat-responsive coil 18, an insulating sleeve 30, preferably formed of woven glass fibers impregnated with silicone, is slipped over the lead wire 29 and the portions 28 of the connector strips 27. Adjacent the strip portions 28 and encircling the sleeve 30 a metal band 31 is provided, and a second metal band 32 is mounted on the sleeve 30 adjacent its other end. Between the bands 31 and 32 a calibrating coil 33 is wound, having its ends respectively joined to the bands 31 and 32. The other end of the heat-responsive coil 18 is also joined to the band 31, and a second lead wire 34 is joined to the band 32.

The lead wires 29 and 34 and the calibrating coil 33 are preferably of low-temperature coefficient metal such as that known commercially as constantan, and the bands 31 and 32 are preferably of stainless steel. While the coil 18, coil form 19 and connector strips 27 are preferably made of nickel, it should be understood that other suitable metals having high-temperature coefficients of resistance may be used, the essential consideration being that all said components are of the same material.

The reason for this is as follows: The metal band 31 is in the same location as the portions 28 of the connecting strips 27, and is closely adjacent the said portions. Consequently the band and the connector portions will always remain at substantially the same temperatures. This, together with the making of the coil, coil form and strips of the same metal, is responsible in part for the important feature of the present invention whereby accurate responses are obtained throughout the range of temperature of the bulb. The E. M. F. or thermocouple effect produced by the juncture between the band 31 and the end of the calibrating coil 33 can be combined with that between the band and the heat-responsive coil 18, and considered as a single E. M. F. produced in the present case, between constantan and nickel. This E. M. F. will thus be equal to the E. M. F. between the constantan lead wire 29 and the nickel connecting strip portions 28 due to their both being close to each other and therefore always at the same temperature. These E. M. F.'s will therefore oppose and cancel out each other whereby inaccuracy in the response of the resistance bulb will be greatly reduced.

The improved resistance bulb as above constructed is extremely simple, being constituted of relatively few parts which are of economical construction and assembly. The structure has been found to be sturdy and resistant to shock and vibration, thus making for reliability in operation over an extended period of use.

By virtue of the close proximity between the inner walls of the casing 10 and the convolutions 18a of the heat-responsive coil, efficient exchange of heat is effected whereby the response of the resistance bulb to temperature changes is rapid and accurate.

The silicone insulating films between the coil 18 and the coil form 19 and casing 10 are effective in resisting rupture and providing adequate heat resistance and electrical insulation. I have found that the pressure maintained on the coil convolutions by the compressed coil form 19 is relatively light, and much less than that required to cause a rupture of the insulating film.

Variations and modifications may be made within the scope of this invention and portions of the improvements may be used without others.

I claim:

1. A rapid-response resistance thermometer bulb comprising a tubular metal casing adapted to be inserted into a well in a heated instrumentality; a coil of heat-responsive wire disposed within the casing adjacent the inner walls thereof, the distance between the coil convolutions and the inside of the casing being of a minute order to promote an efficient transfer of heat; means, including a longitudinally-split metal tube on which the coil is wound, for supporting the coil in the casing in said closely-spaced relationship to the inner casing walls, said tube being biased to maintain the coil convolutions taut; and heat-resistant means for electrically insulating the coil from the casing.

2. A rapid-response resistance thermometer bulb comprising a tubular metal adapted to be inserted into a well in a heated instrumentality; a coil of heat-responsive wire disposed within the casing adjacent the inner walls thereof, the distance between the coil convolutions and the inside of the casing being of a minute order to promote an efficient transfer of heat; means for internally supporting the coil in the casing in said closely-spaced relationship to the inner casing walls, said means including a resilient metal coil form constructed and biased to maintain a uniform, relatively light pressure on the insides of the coil convolutions; and a thin, heat-resistant film of relatively tough insulating material disposed between the coil convolutions and coil form, said film normally requiring pressures to rupture it which are greatly in excess of the pressure existing between the coil form and coil convolutions.

3. A rapid-response resistance thermometer bulb comprising a tubular metal casing adapted to be inserted into a well in a heated instrumentality; a coil of heat-responsive wire wound in a simple helix having a straight axis, said coil being disposed within the casing adjacent the inner walls thereof with its axis extending longitudinally of the casing, the distance between all portions of the wire in the coil convolutions and the inside of the casing being of a minute order to promote an efficient transfer of heat, and the coil convolutions being spaced from each other; means for internally supporting the coil in the casing in said closely-spaced relationship to the inner casing walls, including a smooth cylindrical tubular metal member on which the coil is wound, said member being in intimate heat-conducting relation with said coil, and being adapted to intercept heat radiated inwardly from said casing; and heat-resistant means for electrically insulating the coil from the casing.

4. A rapid-response resistance thermometer bulb comprising a tubular metal casing adapted to be inserted into a well in a heated instrumentality; a heat-absorbent and heat-conducting coil form having a smooth cylindrical outer surface disposed within and spaced from said casing; heat-responsive means comprising solely a single-layer coil of heat-responsive wire wound in a simple helix having a straight axis, said coil being carried by the coil form with its axis extending longitudinally of the form and occupying space between the form and the casing, the coil convolution being spaced to enable heat from the casing to be radiated to the coil form and the distance between all portions of the wire in the coil convolutions and the inner surface of the casing being of a minute order to promote an efficient transfer of heat; and a thin film of heat-resistant electrically-insulating material located between the coil and said inner casing surface, all of said coil convolutions being in good heat-conducting relation to both the casing and the coil form.

5. A rapid-response resistance thermometer bulb comprising relatively thin, tube-shaped, outer and inner metal members having closely spaced walls providing for relatively high degree of heat exchange, the inner member having a smooth cylindrical surface; heat-response means comprising solely a single-layer coil of heat-responsive wire wound in a simple helix having a straight axis, said coil being carried by the inner member with its axis extending longitudinally of the member, and occupying space between the members; and thin films of heat-resistant electrically-insulating material located between the coil and the adjacent surfaces of said members, the coil convolutions being spaced from each other and the distance between all portions of the wire in the coil convolutions and the adjacent surfaces of the outer and inner members being of a minute order whereby heat is efficiently transferred from the members to each other and to the coil.

6. A resistance thermometer bulb comprising an elongate tubular sheath; a coil form of heat-responsive, low temperature coefficient metal, disposed in said sheath; a pair of connector members within the sheath, one constituted of the same metal as the coil form; means electrically connecting together the coil form and said one connector member; a pair of low temperature coefficient wires of the same metal, disposed in said sheath and respectively joined to said connector members; and a coil of heat-responsive wire made of the same metal as the coil form, wound on said form and having one end connected thereto and the other end connected to the other connector member, the three junctures between the said wires and connector members being disposed substantially at the same point measured longitudinally of the sheath whereby their temperatures are substantially equal, and their E.M.F.'s cancel each other.

7. The invention as defined in claim 1 in which the coil form has a longitudinal slot and is compressible to a smaller diameter, and in which portions of the coil convolutions spanning the slot are bent inward from the helix defined by said convolutions, the coil and coil form being compressed diametrically, when in the casing, by engagement with the casing walls.

8. A resistance thermometer bulb comprising a metal coil form; a metal connector stud projecting from one end of the coil form and electrically connected thereto; a low temperature coefficient lead wire electrically joined to said stud and extending axially therefrom; an insulating sleeve encircling said stud and lead wire and the juncture thereof; a calibrating coil wound on said sleeve; a connector member secured around said sleeve at said juncture; a heat-responsive coil wound on said coil form, one end of each of said coils being connected to said connector member and the other end of the heat-responsive coil being connected to said coil form; and a second low temperature coefficient wire connected to the other end of the calibrating coil.

9. A heat-responsive subassembly for a resistance thermometer bulb, comprising a resilient, longitudinally split, elongate tubular metal coil form; a coil of heat-responsive wire wound on said coil form, the latter being compressed diametrically by the coil whereby the coil convolutions are held taut; and heat-resistant, electrical insulating means bonding said coil to the coil form.

10. A heat-responsive subassembly for a resistance thermometer bulb, comprising a resilient, longitudinally split, elongate tubular metal coil form having inturned longitudinally extending flanges along the split portions; a coil of heat-responsive wire wound on said coil form, the latter being compressed diametrically by the coil whereby the coil convolutions are held taut; and heat-resistant, electrical insulating means bonding said coil to the coil form.

11. A rapid-response resistance thermometer bulb comprising a tubular metal casing adapted to be inserted into a well in a heated instrumentality; heat-responsive means comprising solely a single-layer coil of heat-responsive wire wound in a simple helix having a straight axis, said coil being disposed within the casing adjacent the inner walls thereof with the coil axis extending longitudinally of the casing, the coil convolutions being spaced apart and the distance between all portions of the wire in the coil convolutions and the inside of the casing being of a minute order to promote an efficient transfer of heat; means for internally supporting the coil in the casing in said closely-spaced relationship to the inner casing walls, including a thin metal tube-like member of relatively large area and small mass and having a smooth surface, disposed in intimate heat-conducting relation with said coil and adapted to intercept inwardly from said casing; and heat-resistant means for electrically insulating the coil from the casing.

KNUD J. KNUDSEN.

REFERENCES CITED

The following references are of record in the file of this patent:

UNITED STATES PATENTS

| Number | Name | Date |
| --- | --- | --- |
| 1,411,396 | Wilson et al. | Apr. 4, 1922 |
| 2,156,826 | Ullman | May 2, 1939 |
| 2,372,840 | Mattern | Apr. 3, 1945 |
| 2,379,530 | Lederer | July 3, 1945 |
| 2,476,099 | Knudsen | July 12, 1949 |